(No Model.) 2 Sheets—Sheet 1.

S. HAYWARD.
FURNITURE.

No. 356,938. Patented Feb. 1, 1887.

Witnesses:
Walter E. Lombard
Charles E. Folsom

Inventor:
Samuel Hayward (No Model.) 2 Sheets—Sheet 2.

S. HAYWARD.
FURNITURE.

No. 356,938. Patented Feb. 1, 1887.

Witnesses:
Walter E. Lombard
Charles E. Folsom

Inventor:
Samuel Hayward

UNITED STATES PATENT OFFICE.

SAMUEL HAYWARD, OF BOSTON, MASSACHUSETTS.

FURNITURE.

SPECIFICATION forming part of Letters Patent No. 356,938, dated February 1, 1887.

Application filed September 1, 1886. Serial No. 212,361. (No model.)

*To all whom it may concern:*

Be it known that I, SAMUEL HAYWARD, of Boston, in the county of Suffolk and State of Massachusetts, have invented certain new and useful Improvements in Furniture, of which the following, taken in connection with the accompanying drawings, is a specification.

Where small families are forced, on account of limited means, to live in a very small number of rooms, it is quite desirable, and sometimes absolutely necessary, that a single piece of furniture should serve two or more purposes, and therefore it is my object in my present invention to produce an article which may serve as a dining or center table for the middle of the room, while by a few simple changes it may be readily adapted for use as a sideboard or similar article, to be placed against the wall of the room, and which should be of a height different from that of the table; and my invention consists in certain novel constructions, arrangements, and combinations of parts, which will readily be understood by reference to the description of the drawings and to the claim to be hereinafter given.

Figure 1:
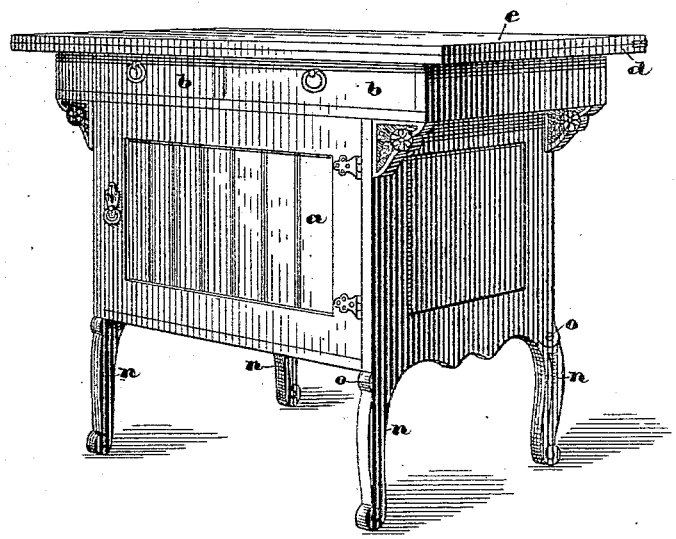
Figure 2:
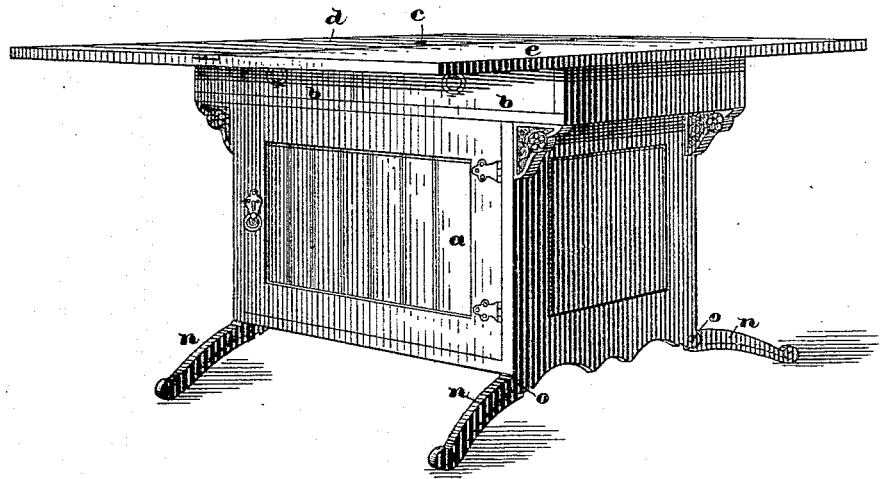
Figure 9:
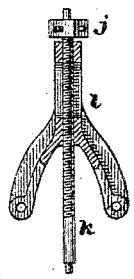
Figure 8:
Figure 3:
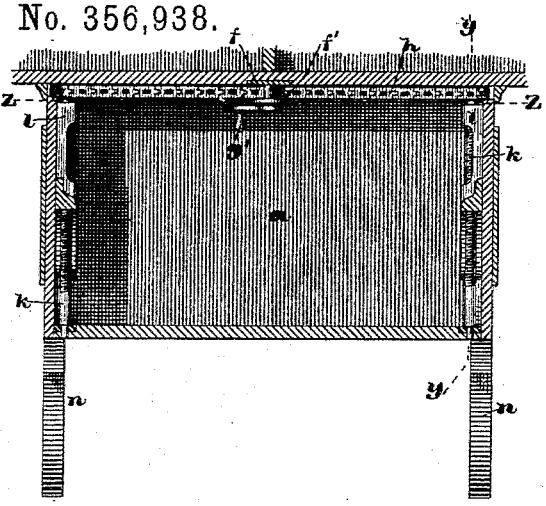
Figure 4:
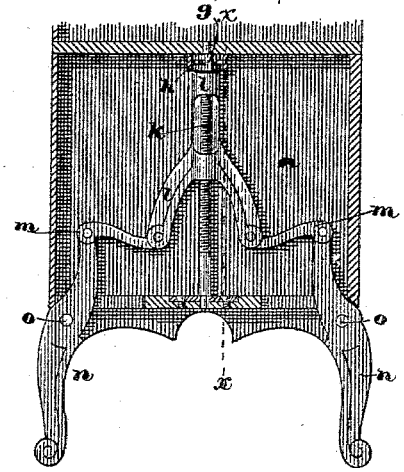
Figure 5:
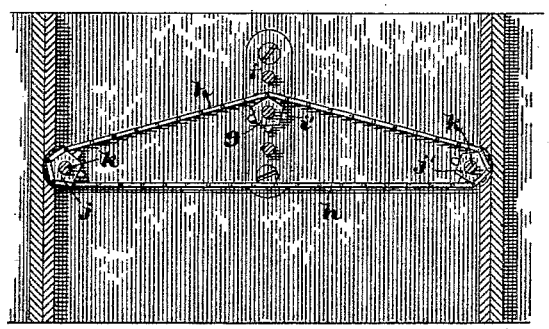
Figure 6:
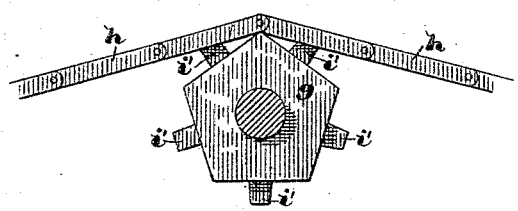
Figure 7:
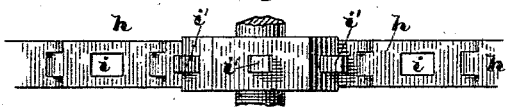

Of the drawings, Figure 1 represents a perspective view of my improved piece of furniture adapted for use as a sideboard. Fig. 2 represents a perspective view of the same adapted for use as a dining-table. Fig. 3 represents a sectional elevation of the lower portion of the same, and showing the devices for simultaneously adjusting the legs thereof, the cutting-plane of said section being on line $x$ $x$ on Fig. 4. Fig. 4 represents a cross-sectional elevation of the same, the cutting-plane being on line $y$ $y$ on Fig. 3. Fig. 5 represents an inverted sectional plan, the cutting-plane being on line $z$ $z$ on Fig. 3. Figs. 6 and 7 represent, respectively, a plan and an elevation of one of the sprocket-wheels and a portion of the operating-chain, said views being drawn to an enlarged scale. Fig. 8 represents a sectional elevation of the chain-operating sprocket-wheel and its frame detached; and Fig. 9 represents an elevation of one of the screw-shanks, its operating sprocket-wheel, and the forked piece operated thereby, said forked piece being cut in section at its threaded bearings.

In the drawings a combined sideboard and dining-table is represented, which is especially adapted for small families of limited means, and which is provided with a cupboard, $a$, and two drawers, $b$ $b$, and has pivoted to its upper surface at $c$ the folding top $d$ $e$. To the under side of the top wall of said cupboard $a$ is secured the plate $f$, which in turn has secured to it at a short distance therefrom the secondary plate $f'$, and between these plates is mounted in suitable bearings the sprocket-wheel $g$, which is revolved by the handle $g'$ when it is desired to move the sprocket-chain $h$ in either direction.

The sprocket-chain $h$ is made in any well-known manner, each link being provided with an aperture, $i$, which engages with and is moved by the projecting points $i'$ upon the wheel $g$. These apertures $i$ $i$ also engage with points upon the sprocket-wheels $j$ $j'$, secured to the screw-shanks $k$ $k$, mounted in a vertical position in suitable bearings at either end of said cupboard $a$, and cause said sprocket-wheels $j$ $j'$ to revolve together, and thus raise or lower the forked nuts $l$ $l$, to the ends of the forked arms of which are pivoted the connecting-links $m$ $m$, the opposite ends of which are pivoted to the upper ends of the legs $n$ $n$, which are pivoted at $o$ $o$ to the side walls of the cupboard $a$. The sprocket-chain $h$ is continuous and passes in a straight line from the sprocket-wheel $j$ to the sprocket-wheel $j'$, and then back again to the first wheel, $j$, after passing partly about the wheel $g$, from which motion is derived, and which is placed some little distance out of line with the wheels $j$ $j'$ in order to make said chain taut, all as fully shown in Fig. 5.

It is a well-known fact that a sideboard, to be a convenience, must be of a certain height, while a table to eat at or write upon must, for the same reason, be of an entirely different height, and this change of height is readily accomplished by the device described by simply turning the handle $g'$ and thus revolving the sprocket-wheel $g$, and through the chain $h$ the wheels $j$ $j'$ will also be revolved, together with the screw-shanks $k$ $k$, upon which said wheels are secured. The shanks $k$ $k$, in revolving, will turn in the threaded bearings of the forked nuts $l$ $l$ and force the same downward, allowing in this manner the links $m\ m$ to assume nearer a vertical position and the upper arms of the legs $n\ n$ to move toward the center and about the pivots $o\ o$, and by so doing they will assume nearer a horizontal position, or the position illustrated in Fig. 2, and thus lower the table to a height convenient for use as a dining or writing table, it being understood that the hinged tops $d\ e$ are to be swung about the pivot $c$ and opened, all as shown in Fig. 2.

If the table as shown in Fig. 2 is desired to be used for drawing or for any other purpose where it is desirable to stand at, rather than sit at, the same, the said table may readily be elevated to a greater height by revolving the sprocket-wheel $g$ in the opposite direction.

One great advantage of this device for adjusting the height of the table or other article is that by it any height within a certain range may be obtained, and another advantage is that this may all be done at a single operation.

The further operation and advantages are so apparent as to need no further mention here.

It is obvious that an endless band of metal or leather may be used instead of the chain $h$ without altering the principles of my invention.

What I claim as new, and desire to secure by Letters Patent of the United States, is—

The combination, in an article of furniture, of the closet $a$, the pivoted folding top $d\ e$, four independently-pivoted legs, $n\ n$, four links, $m\ m$, two forked nuts, $l$, two vertical screws, $k$, the sprocket-wheels $g$, $j$, and $j'$, the chain $h$, and the crank $g'$, all constructed and arranged to operate substantially as and for the purposes described.

In testimony whereof I have signed my name to this specification, in the presence of two subscribing witnesses, on this 30th day of August, A. D. 1886.

SAMUEL HAYWARD.

Witnesses:
WALTER E. LOMBARD,
CHARLES E. FOLSOM.